C. W. A. KOELKEBECK.
SAILING VESSEL.
APPLICATION FILED MAR. 3, 1921.
1,438,246.
Patented Dec. 12, 1922.
5 SHEETS—SHEET 2.
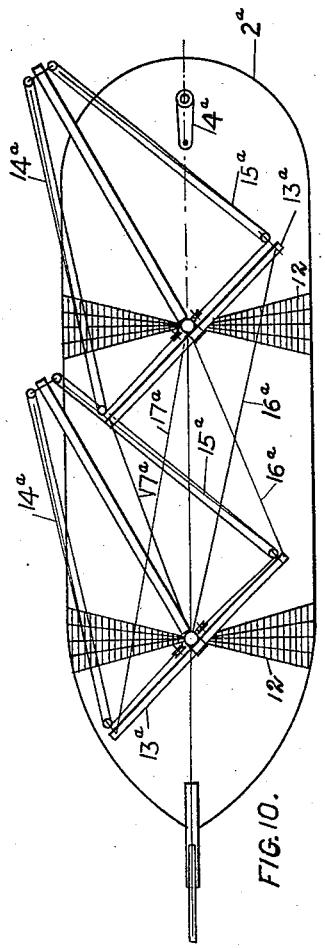
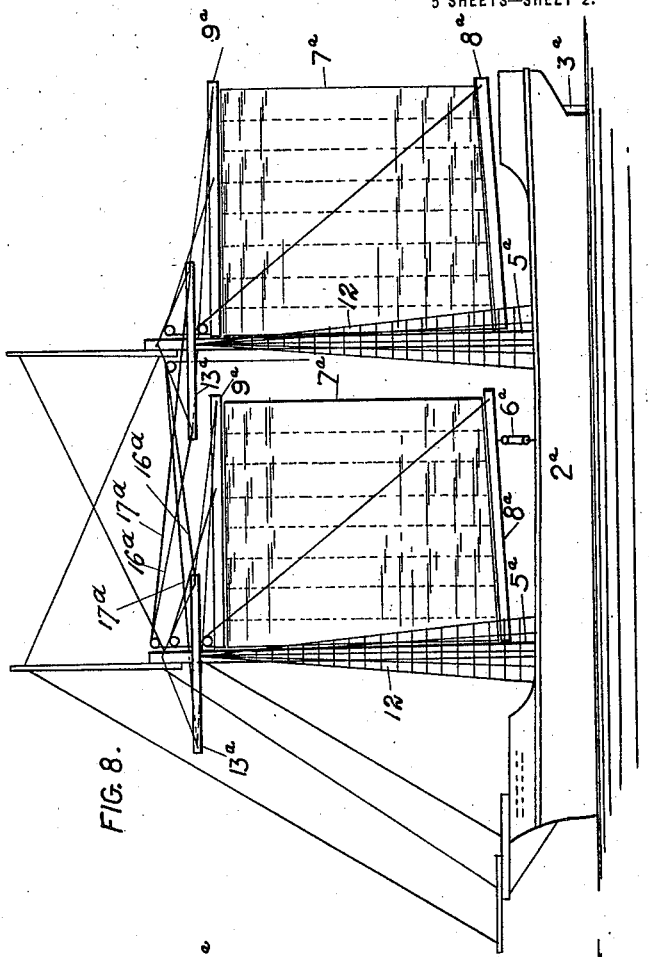
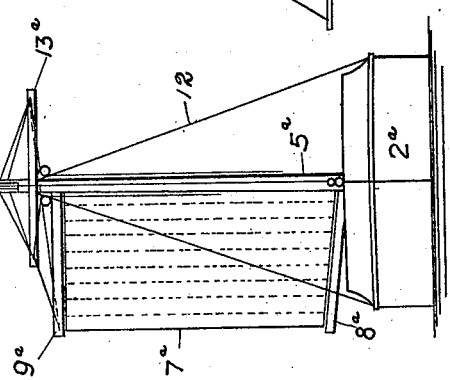

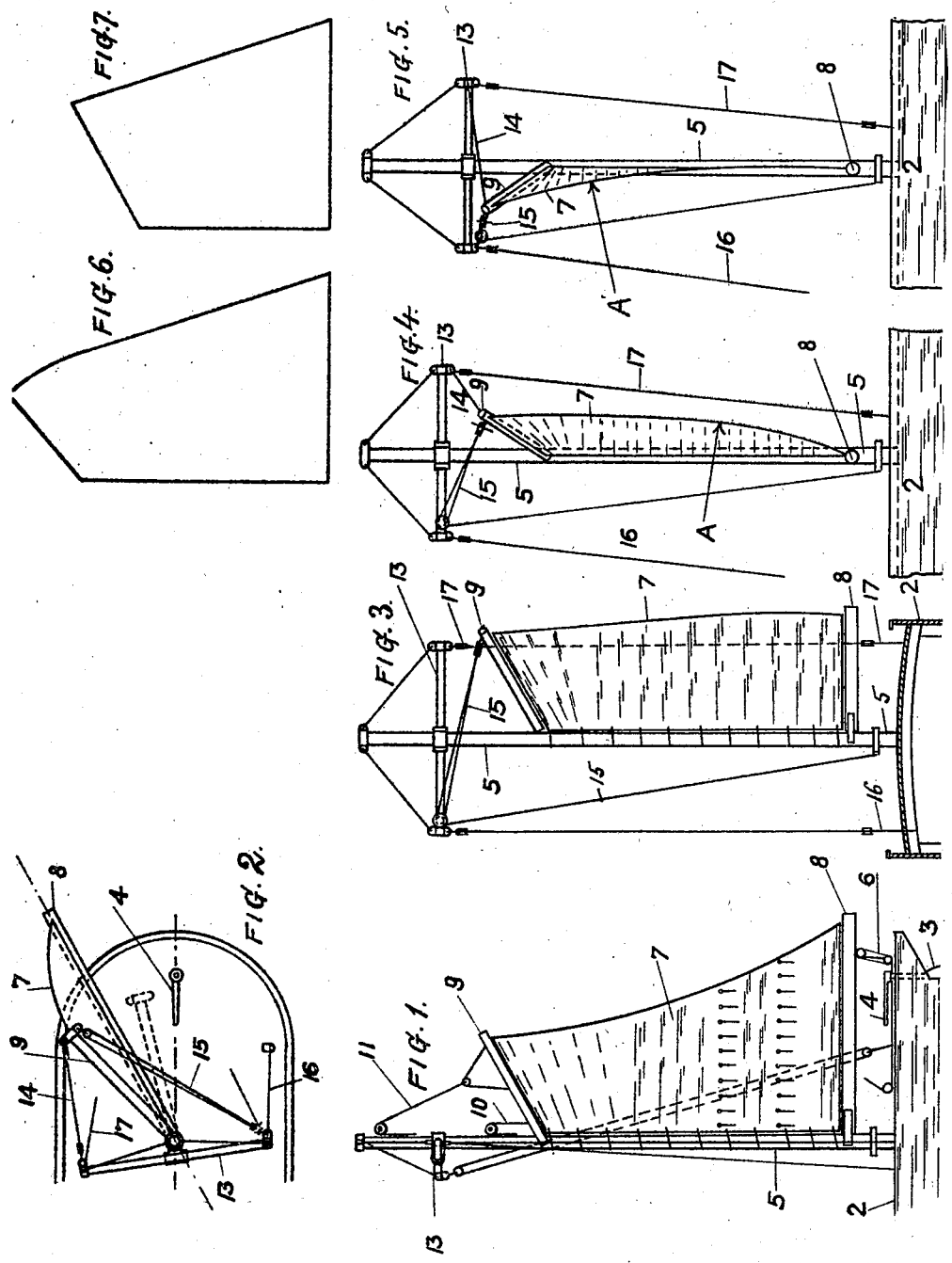

C. W. A. KOELKEBECK.
SAILING VESSEL.
APPLICATION FILED MAR. 3, 1921.

1,438,246.

Patented Dec. 12, 1922.
5 SHEETS—SHEET 3.

INVENTOR
C. W. A. Koelkebeck
by Bakewell, Byrnes & Parmelee
his ATTORNEYS

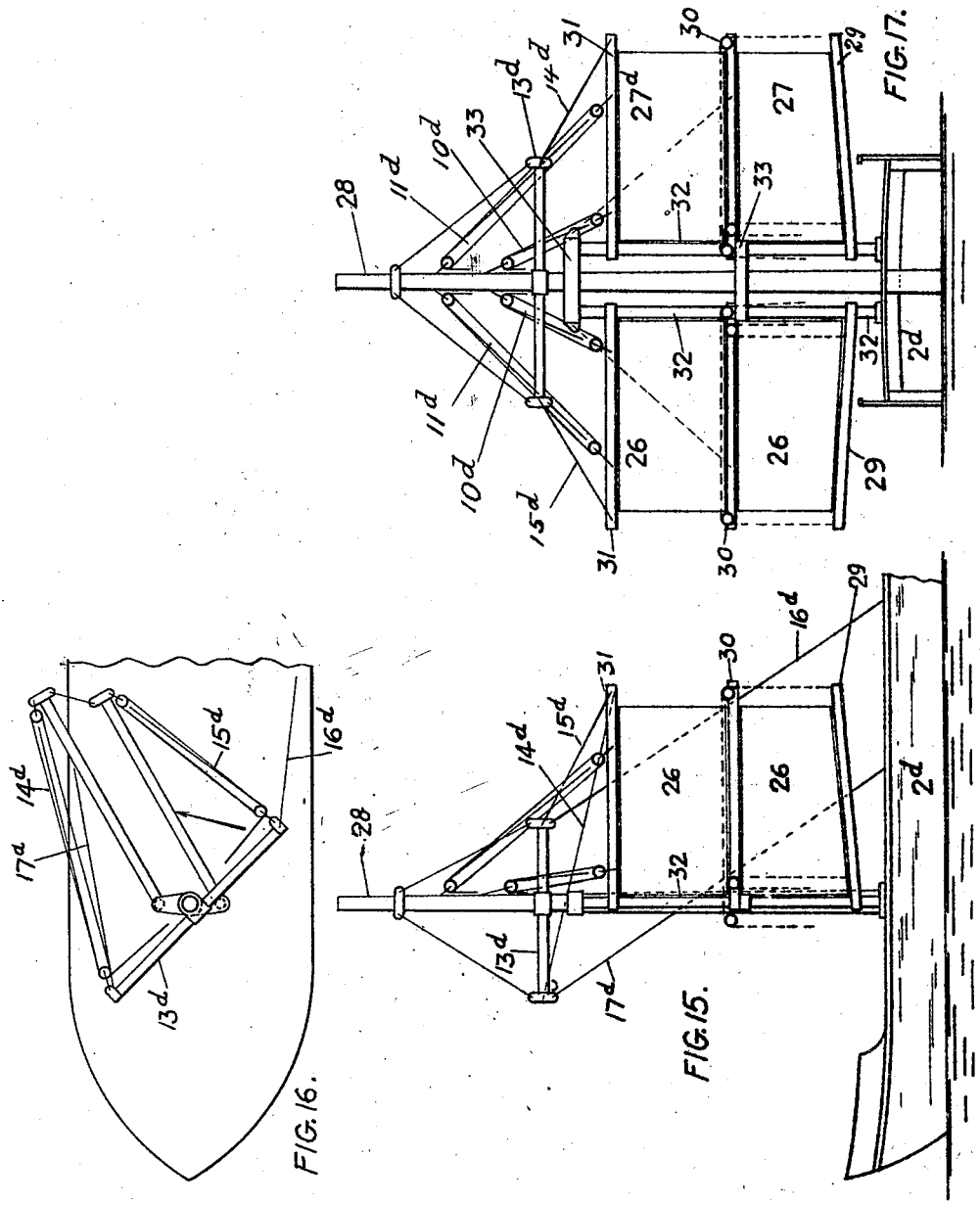

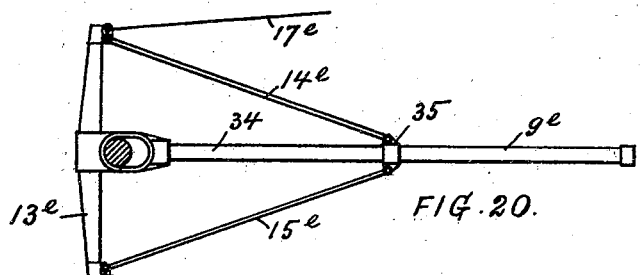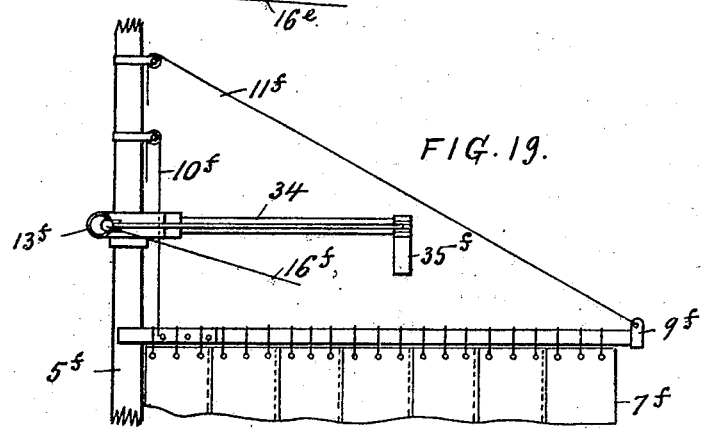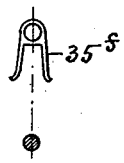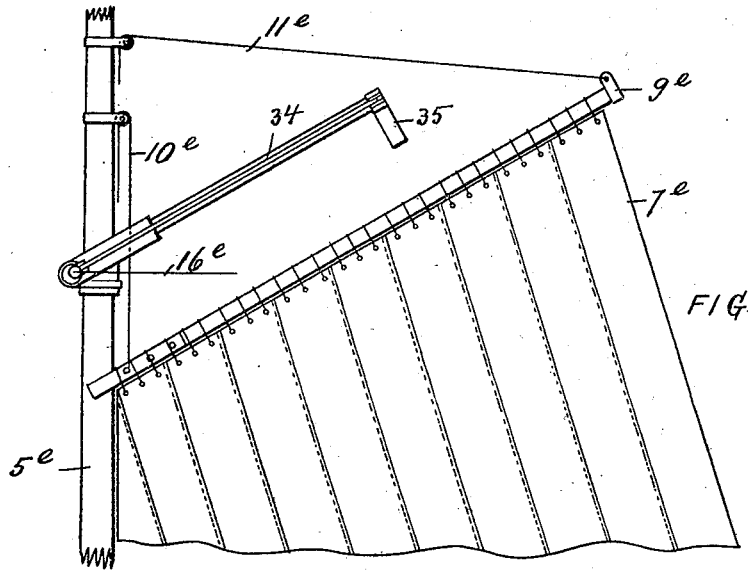

Patented Dec. 12, 1922.

1,438,246

UNITED STATES PATENT OFFICE.

CARL W. A. KOELKEBECK, OF PITTSBURGH, PENNSYLVANIA.

SAILING VESSEL.

Application filed March 3, 1921. Serial No. 449,434.

*To all whom it may concern:*

Be it known that I, CARL W. A. KOELKEBECK, a citizen of the United States, residing at Pittsburgh, Allegheny County, Pennsylvania, have invented a new and useful Improvement in Sailing Vessels, of which the following is a full, clear, and exact description, reference being had to the accompanying drawings, forming part of this specification, in which—

Figure 1 is a side elevation of a portion of a sailing vessel embodying my invention;

Figure 2 is a plan view of the same;

Figure 3 is a transverse section showing a rear view of the rigging;

Figures 4 and 5 are rear elevations, with the sail in different positions;

Figure 6 is a plan view showing the proper form of sail for use in connection with my invention;

Figure 7 is a similar view showing the usual form of sail, Figures 6 and 7 being comparative views;

Figure 8 is a side view showing a modification;

Figure 9 is a front elevation of the vessel shown in Figure 8;

Figure 10 is a plan view of the same;

Figure 15 is a side view showing another modification;

Figure 16 is a plan view of the vessel shown in Figure 15;

Figure 17 is a rear elevation of the vessel shown in Figures 15 and 16.

Figures 18 and 19 are side elevations of a portion of a rigging showing two further modifications;

Figure 20 is a plan view of the yard and trailer device shown in Figure 18; and

Figure 21 is a detail view of the yoke.

Figure 11:
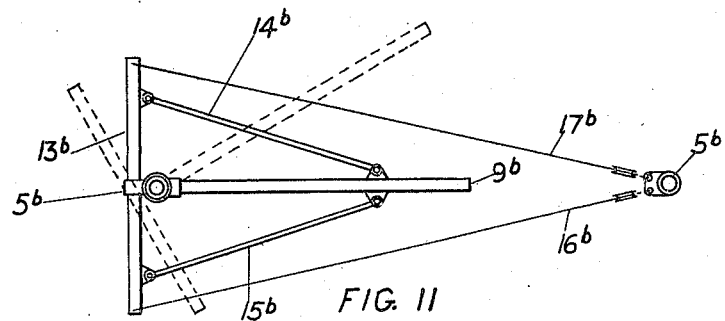
Figure 11 is a plan view, and Figure 12 a side elevation, showing a modification of certain parts.

Most of the figures of the drawings are largely diagrammatic or conventional.

My invention has relation to sailing vessels, and more particularly to that class of sailing vessels known as "fore-and-aft" or "schooner-rig" sailing vessels.

The object of my invention is to provide a vessel of this character having a novel rigging which is more effective in its action and also provides for greater convenience of operation, and which has the resultant wind pressure at a lower level.

The nature of my invention will be best understood by reference to the accompanying drawings, in which I have shown several modifications of my invention and which will now be described, it being premised, however, that the invention may be embodied in other ways without departing from the spirit and scope of the invention as defined in the appended claims.

Referring first to that form of my invention shown in Figures 2 to 7, inclusive, the numeral 2 designates the hull of the vessel, 3 the rudder, 4 the helm, 5 the mast, 6 the main sheet, 7 the sail or spanker, 8 the boom, 9 the gaff, 10 the throat halyard, 11 the peak halyard, and 12 the ratlines.

One feature of my invention consists in the provision of mechanical means for forcing the gaff 9 into the wind, so that the gaff is at an entirely different angle with the longitudinal axis of the ship than the boom 8. This difference in angularity may amount to as much as 30°.

In the ordinary sailing vessel, the invention is to have the sail present a surface of even slant to the wind. If the middle portion of the sail has the proper angle with the wind, the boom is necessarily too far into the weather, while the gaff is too far to the lee. It will be readily seen by reference to Figure 4 that in such cases the resultant wind pressure, as indicated by the arrow A, will be in a downward direction, thus increasing the burden of the ship. If, however, the gaff be forced over to the wind, as best indicated in Figures 2 and 5, the resultant wind pressure, as indicated by the arrow A' in Figure 5, is in an upwardly slanting direction. This serves to greatly relieve the vessel of a part of its burden, instead of adding to it.

Various means may be provided for forcing the gaff into the wind. In the form shown on Sheet 1, this is effected by means of a yard 13, which is rotatably mounted on the mast 5 and is coupled to the peak of the gaff by means of two sets of blocks and tackles 14 and 15. The yard 13 also has the bracing lines 16 and 17, which extend rearwardly and downwardly to the deck of the vessel. Assuming the wind to be blowing over the port beam, it will be apparent that the sail and gaff have a tendency to swing to the starboard side of the vessel; but this will be resisted by the block and tackle 15, the yard 13 being firmly held against rotative movement around the mast by the brace 17. If the wind is from the starboard side, then the gaff will be over the port, and the block and tackle 14 and the brace 16 will come into play.

In Figures 8, 9, and 10, I have shown my invention applied to a two-masted vessel. In these figures, corresponding parts have been given the same reference numerals as in the form first described, but with the affix "a" added thereto. By reference to Figures 8 and 10, it will be noted that the braces 16 and 17 are brought rearwardly at a greater angle, from one mast to the other, and then down to the deck, this arrangement being more favorable to the braces and also for operation by the sailors, the load not being increased as it would be if the braces were run at a steep angle to the deck.

Figure 12:
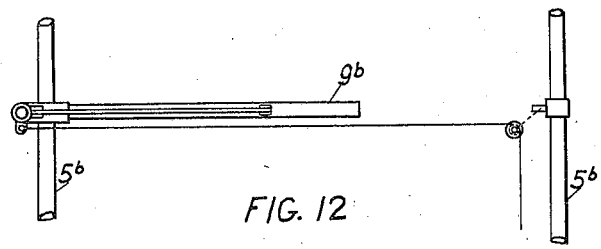

In Figures 11 and 12, I have shown a modification in which the gaff $9^b$, the yard $13^b$, and the tackle members $14^b$ and $15^b$ constitute a rigid frame. In this case, the tackle members may be made of metal rods, cables, tubes, or other suitable material. It will be noted that the gaff is forced to partake of any rotative motion that the yard $13^b$ may have around the mast $5^b$; and that the mariner has it in his power, by using the braces $16^b$ and $17^b$, to rotate the yard, thus adjusting the gaff at will. The dotted lines in Figure 11 indicate the gaff and yard at a certain angle which they might occupy with the ship on a port tack.

Figure 13:
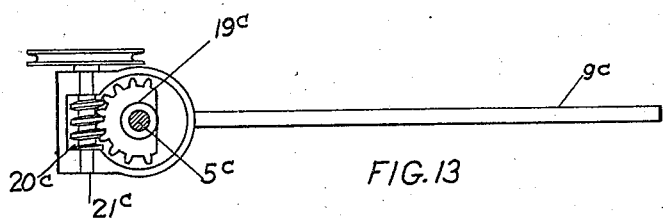
Figure 13 is a detail plan view showing another modification.
Figure 14:
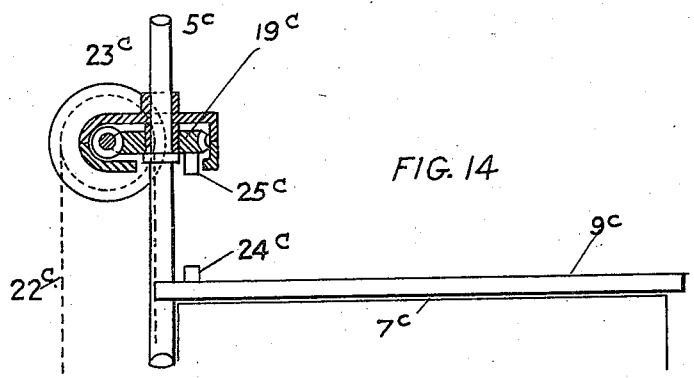
Figure 14 is a view, partly in side elevation and partly in vertical section, of the parts shown in Figure 13.

In Figures 13 and 14 I have shown another form of means for actuating the gaff. Such means comprise a worm gear wheel 19 fixed to the mast $5^c$ and actuated by a worm 20 on the shaft 21, which may be actuated by a hand chain 22 running over a chain wheel 23 and extending down to the deck. The gaff $9^c$ is provided with a lug or projection 24 which when raised is adapted to be engaged by another lug or projection 25 on the worm gear wheel 19. When these lugs are so engaged, the hand chain 22 can be actuated to force the gaff over to the wind.

Referring now to the form of my invention shown in Figures 15, 16, and 17: in this form I carry two sails 26 and 27 on a single mast 28. Each of these sails is provided with a bottom boom 29, a middle boom 30, and a gaff 31. The two booms and gaff of each sail are rotatably engaged with a sub-mast 32 stepped in the deck at its lower end and connected to the mast proper by the crossarms 33. The lower booms 29 are vertically movable on the sub-masts by any suitable rigging, while the middle booms 30 are stationary with respect to vertical movement.

In furling these sails the sailor lifts the lower boom and lower portion of the sail up to the middle boom, and lowers the upper portion of the sail and its gaff, the sails being tied around the middle booms. In unfurling the sails, the sailor lifts the upper portions of the sails only, while the lower portions with their lower booms fall by gravity. In reefing, the sailor can either lower the upper portion of the sail or lift the lower portion, the latter proceeding being preferred in rough weather.

By having two spanker sails of this character on one mast, the two sails can act in unison, being either spread out "wing-and-wing," as shown in Figure 17; or the two spankers may work side by side, as shown in Figure 16, there being sufficient space between the two sails for the wind to act effectively on the leeward sail. This arrangement does away with the use of a spinnaker, and is more effective; since the spinnaker is not effective while the ship is tacking against the wind, while in my arrangement both sails are effective in all positions thereof.

In Figures 15, 16, and 17, I have also shown the gaffs 31 as provided with means similar to those described in connection with the preceding figures, whereby they may be forced to windward. In these figures, $13^d$ designates the yard, $14^d$ and $15^d$ the blocks and tackles, and $16^d$ and $17^d$ the braces, for adjusting the yard.

In Figures 18 to 20 I have shown a modification in which the rotatable yard $13^e$ carries a trailer arm 34 extending along the gaff and carrying a yoke 35 which, when the gaff $9^e$ is fully raised, will engage the latter to swing it to the desired position. The yard can be swung by the brace-line $16^e$ and $17^e$, similar to those previously described. In Figure 18, the sail $7^e$ is shown as having a peaked or slanting top. In Figure 19, the yard and trailer arrangement of Figures 18 and 20 is shown applied to a square-top sail $7^f$. In this figure $9^f$ is the gaff, $13^f$ the yard, $34^f$ the trailer, and $35^f$ the yoke on the trailer. In this figure, the gaff is not fully lifted.

I claim:

1. In a sailing vessel of the character described, a sail having a boom and a gaff, and means for forcing the gaff into the wind so that it will be at any desired angle with the longitudinal axis of the ship, substantially as described.

2. In a sailing vessel of the character described, a sail having a boom and a gaff, a yard pivoted to the ship's mast, and means connecting the yard and gaff, whereby the yard may be moved to force the gaff into the wind, substantially as described.

3. In a sailing vessel of the character described, a mast, a sail having a boom and a gaff and means operable from the deck of the vessel for forcing the gaff into the wind so that it will be at any desired angle with the longitudinal axis of the ship.

4. In a sailing vessel of the character described, a mast, a sail having a boom and a gaff, and means supported by the mast for forcing the gaff into the wind so that it will be at any desired angle with the longitudinal axis of the ship.

In testimony whereof I have hereunto set my hand.

CARL W. A. KOELKEBECK.